United States Patent
Keller et al.

(10) Patent No.: US 6,584,771 B2
(45) Date of Patent: Jul. 1, 2003

(54) PISTON FOR A HYDRAULIC CYLINDER, IN PARTICULAR A CLUTCH MASTER CYLINDER FOR MOTOR VEHICLES

(75) Inventors: Christoph Keller, Massbach (DE); Stefan Gebert, Gestungshausen (DE); Herbert Sauer, Pfarrweisach (DE)

(73) Assignee: FTE automotive GmbH (DE)

( * ) Notice: Subject to any disclaimer, the term of this patent is extended or adjusted under 35 U.S.C. 154(b) by 0 days.

(21) Appl. No.: 09/877,698

(22) Filed: Jun. 8, 2001

(65) Prior Publication Data

US 2002/0020291 A1 Feb. 21, 2002

(30) Foreign Application Priority Data

Jun. 9, 2000 (DE) .......................... 100 28 673

(51) Int. Cl.[7] .................................................. B60T 11/26
(52) U.S. Cl. ........................................................ 60/588
(58) Field of Search ............................................ 60/588

(56) References Cited

U.S. PATENT DOCUMENTS

| | | |
|---|---|---|
| 4,922,120 A | 5/1990 | Becker et al. |
| 5,794,512 A * | 8/1998 | Prosch et al. ................ 92/128 |

FOREIGN PATENT DOCUMENTS

| | | |
|---|---|---|
| DE | 37 13 248 C2 | 11/1988 |
| DE | 37 28 783 A1 | 3/1989 |
| DE | 3713248 C2 * | 6/1990 |
| DE | 296 15 799 U1 | 12/1996 |
| DE | 198 06 420 A1 | 8/1999 |
| EP | 0 295 395 | 4/1988 |
| EP | 0 312 673 A1 | 4/1989 |
| EP | 295395 B2 * | 7/1996 |
| GB | 2 222 213 A1 | 2/1990 |

* cited by examiner

Primary Examiner—Edward K. Look
Assistant Examiner—Thomas E. Lazo
(74) Attorney, Agent, or Firm—McAndrews, Held & Malloy, Ltd.

(57) ABSTRACT

A piston for the variable delimitation of a pressure chamber in a housing of a hydraulic cylinder, in particular a clutch master cylinder for motor vehicles, has a main section on which a running surface is provided for a sealing element on the housing side. The sealing element seals a pressure chamber in an operating position of the piston. The piston also has an after-running device, which, in a normal position of the piston, connects the pressure chamber to an after-running area. The after-running device is made separately from the main section and is connected without play to the main section to form the piston. As a result, a piston that is easy to manufacture is created and which, with reference to the after-running device, has an improved functionality compared with prior art.

18 Claims, 1 Drawing Sheet

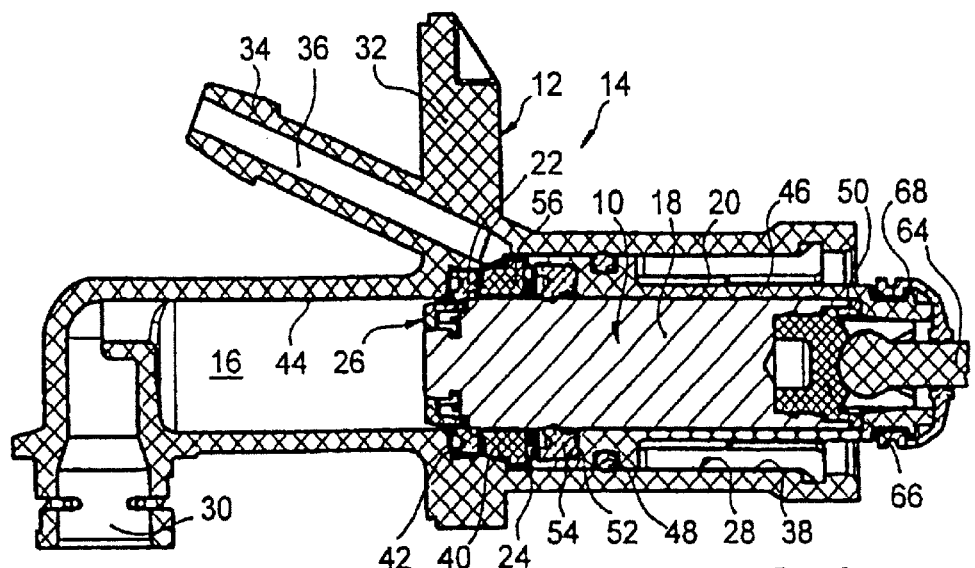
FIG. 1
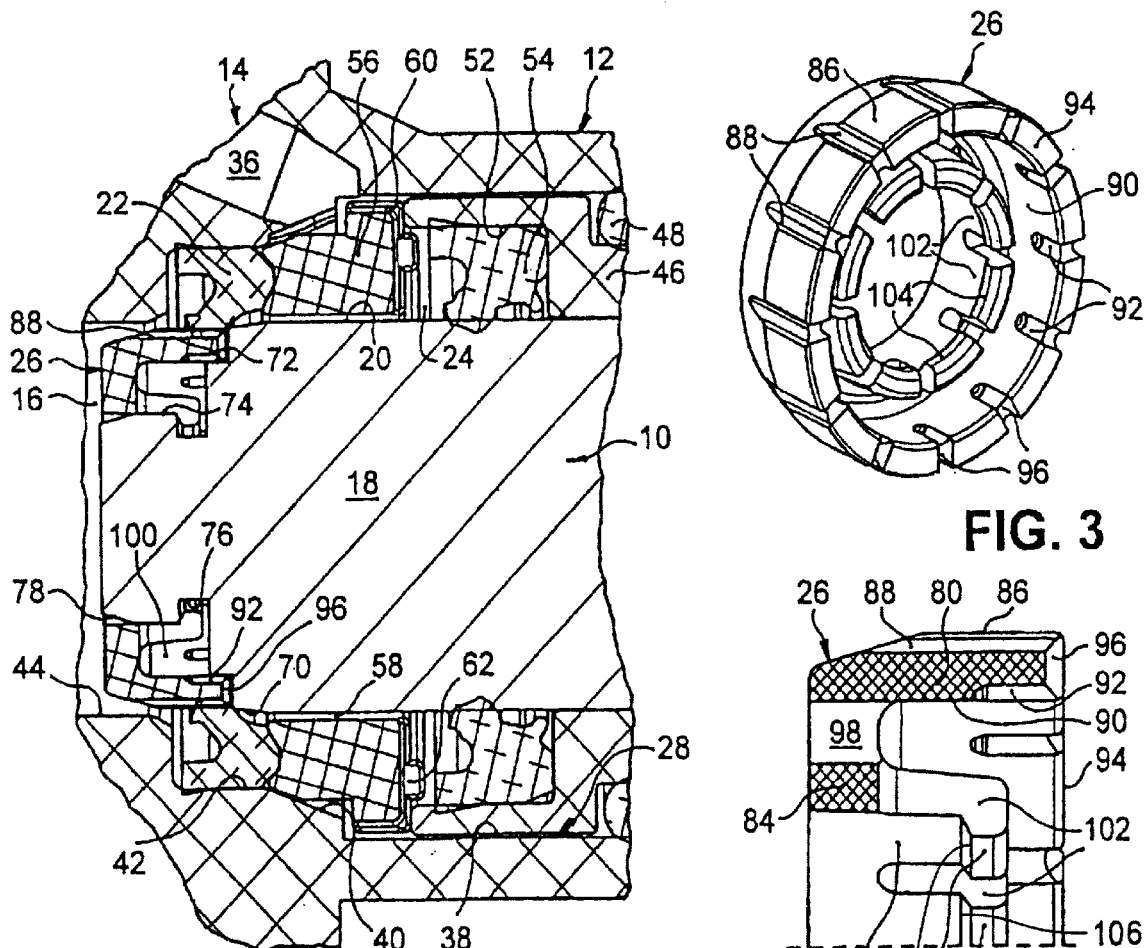
FIG. 2
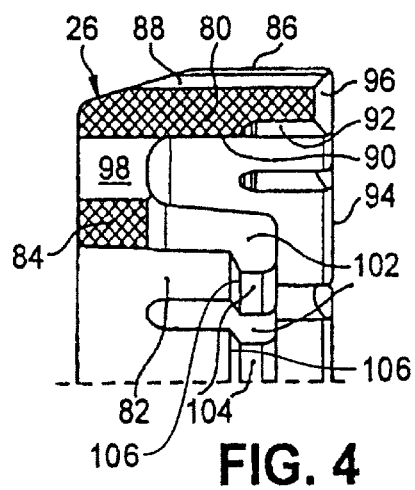
FIG. 3
FIG. 4

PISTON FOR A HYDRAULIC CYLINDER, IN PARTICULAR A CLUTCH MASTER CYLINDER FOR MOTOR VEHICLES

DESCRIPTION OF THE PRIOR ART

The present invention relates to a piston for the variable delimitation of a pressure chamber in a housing of a hydraulic cylinder. In particular, the invention relates to a piston for master cylinders of hydraulic clutch actuating or brake systems in motor vehicles, as used extensively in the automotive industry.

These pistons are used to generate a pressure in the pressure chamber with an axial relative displacement in relation to the housing of the hydraulic cylinder. This pressure is possibly applied to a clutch slave cylinder hydraulically connected to the hydraulic cylinder, which is actively connected to the clutch to disengage a clutch. The piston considered here, also known as a plunger piston because of its design, has a main part with a running surface for (at least) one sealing element and an after-running device. The sealing element is attached to the housing of the hydraulic cylinder and serves to seal the pressure chamber in an operating position of the piston, i.e. with a piston displaced in the direction of the pressure chamber, in co-operation with the running surface. In a normal position, i.e. a position of the piston drawn to a stop, the after-running device connects the pressure chamber to an after-running area which, in turn, is connected to an after-running tank.

Prior art does not lack proposals on how the after-running device should be designed. For example, a piston is known which consists entirely of plastic for economic reasons (DE 38 16 608 A1), whose end on the pressure chamber side is provided with slots running in the longitudinal direction, which form the after-running device in a simple manner. However, this type has the disadvantage that with a relative displacement between plastic piston and sealing element, a noise is generated, which is undesirable in the automotive industry, which appears to be caused by the surface structure of the plastic.

Therefore, it has been suggested that to make the piston, a plastic body is covered with a thin-walled metal tube, at least in the area of the running surface (DE 37 13 248 C2) or is provided with a piston shank sleeve shaped from metal (see the generic DE 195 23 215 A1 for example), which has a closed floor on the pressure chamber side. In the case of these pistons, the after-running device is formed by sniffer grooves extending in the axial direction, which are incorporated in the surface of the piston shank sleeve on the end of the piston shank sleeve facing the pressure chamber. This is normally done without machining, i.e. using an embossing process.

An embossing process of this type does represent an economic production method, but it is also associated with disadvantages. For example, a sharp, dimensionally precise outlet of the sniffer grooves distributed on the perimeter cannot be guaranteed. Consequently, the grooves may have a different length. So that this does not affect the function of the after-running device when the piston is in its normal position, the sealing element has to be positioned in the housing of the hydraulic cylinder with very big tolerances. However, this means that the piston has to travel longer distances before pressure can be built up in the pressure chamber, which ultimately leads to an undesirable loss of pedal stroke. There is also the fact that as the result of the embossing process, an anti-corrosion surface coating applied to the piston shank sleeve may be damaged and detached, which leads to undesirable leakages in operation sooner or later. The same applies to metal-coated surfaces of plunger pistons otherwise made 100% in plastic.

Finally, pistons are known which are made from a solid material, like an aluminum alloy, the equalisation grooves provided on the end on the pressure chamber side being made by groove milling cutters. However, the equalisation grooves made in this way require considerable deburring to prevent damage to the sealing element in operation. As in the case of the piston designs described above, there is also the risk that the running surface of the piston is damaged if the piston has to be held or clamped to make the equalisation grooves.

The object of the invention is to create a piston for hydraulic cylinders that is easy to make and which, with reference to the after-running device, has an improved functionality compared with the prior art described.

SUMMARY OF THE INVENTION

According to the present invention, there is provided a piston for the variable delimitation of a pressure chamber in a housing of a hydraulic cylinder, in particular of a clutch master cylinder for motor vehicles, the piston having an operating position and including a main part, on which a running surface is provided for a sealing element on a housing side, which, in the operating position of the piston, seals the pressure chamber, and the piston further including an after-running device which, in a normal position of the piston, connects the pressure chamber to an after-running area; wherein the after-running device is made separately from the main part and is connected to the main part without play to form the piston.

Through this two-part design of the piston, the after-running device can be made with small tolerances in a simple manner without the risk of damaging the running surface provided on the main part of the piston and having to be after-worked before the after-running device is connected to the main part of the piston and therefore without creating further dimensional differences. As a result, the sealing element can be positioned in the housing of the hydraulic cylinder advantageously with smaller tolerances and the hydraulic cylinder is thereby improved with reference to pedal stroke losses. A further advantage of the two-part piston design is that it allows economic modular solutions. For example, it is possible to use the same after-running device on main parts of different lengths in order to make pistons which allow a stroke corresponding to the requirements concerned.

In one advantageously simple embodiment of the piston, the after-running device can be made as an annular part with an essentially U-shaped cross-section. The play-free connection between the after-running device and the main part is preferably made using a clip connection, which allows an easy assembly of the piston.

If the outside diameter of the running surface is slightly bigger than the outside diameter of the after-running device, and a sloping transition section is provided on the main part between the running surface and the after-running device, the sealing lip of the sealing element in the normal position of the piston is advantageously relieved slightly in contact with the after-running device, whereas with a movement of the piston from the normal position to an operating position via the transition section, the sealing lip is carefully expanded.

In a preferred embodiment of the piston, the after-running device has a radially outer annular section and a radially inner annular section, which are connected to each other via an annular disc section on the end. In this case, the outer annular section of the after-running device can have a cylindrical outside perimeter surface on which the sealing element rests in the normal position of the piston and which is provided with several equalisation grooves distributed over the perimeter, which extend from the free end of the outer annular section in the axial direction in order to ensure, in the normal position of the piston, the connection between the pressure chamber and the after-running area under the sealing element or its sealing lip. Preferably, the equalisation grooves on the outside perimeter surface of the outer annular section extend over the entire length of the outside perimeter surface, which allows easy manufacture, among other things.

In addition, the outer annular section of the outer running device can have a cylindrical inside perimeter surface, by means of which the after-running device radially centers in an advantageously simple manner on a centering shoulder of the main part and which is provided with several equalisation grooves distributed over the perimeter, which extend from the free end of the outer annular section in the axial direction and whose axial length is greater than the width of the centering shoulder in order to allow a hydraulic connection over the centering shoulder. In addition, the free end of the outer annular section of the after-running device forms an annular shoulder, as described in patent claim 10, with which the after-running device is supported without play on the main section in the axial direction in a simple manner and which is provided with several connecting grooves which run in the radial direction. The connecting grooves on the annular shoulder can connect the equalisation grooves on the outside perimeter surface to the equalisation grooves on the inside perimeter surface of the outer annual section. The annular disc section of the after-running device can be provided with at least one connecting duct extending in the axial direction.

It is evident that according to the embodiment of the after-running device described above, a connection between the pressure chamber and the after-running area can not only be achieved via an outer area of the after-running device if the piston is in the normal position, but also advantageously via an inner area of the pressure chamber via the connecting duct in the annular disc section, the equalisation grooves on the inside perimeter surface of the outer annular section and the connecting grooves on the annular shoulder of the outer annular section. Through this embodiment of the after-running device, the undesirable "residual pressure build" can be avoided in the pressure chamber in a simple and reliable manner.

If the position of the sealing element as already discussed above is improved with reference to pedal stroke losses, i.e. the stroke, also referred to as the over-running or valve closing stroke, which the piston has to cover starting from the normal position until the sealing element with its sealing lip is released from the after-running device to separate the pressure chamber and the after-running area, is minimised, there is basically the risk of a "residual pressure build" in the pressure chamber. This then means that the sealing lip of the sealing element pressed against the running surface of the main section in an operating position of the piston because of the pressure in the pressure chamber, particularly at high temperatures of the hydraulic fluid, may be pressed against the counter surface in the normal position of the piston, too, and therefore (partly) closes the passage to the after-running area with a minimised over-running stroke. As a result, a residual pressure in the pressure chamber is not reduced, or only with a time lag, in the direction of the after-running area after the piston returns to the normal position. In the case of hydraulic clutch operations, this can mean that the clutch abrades with excessive wear of the clutch lining or only a reduced torque is transmitted.

The connection described above between the pressure chamber and the after-running area via the inner area of the after-running device also provides a remedy here in a simple manner. Depending on the design and position of the sealing lip of the sealing element, and as a function of the residual pressure in the pressure chamber, a pressure equalisation is created via this inner connection in relation to the area of the compressed sealing lip facing away from the pressure chamber, thereby creating a partial pressure equalisation at the sealing lip or lifting the pressed sealing lip away from the counter surface, so that a pressure equalisation in relation to the after-running area is allowed as a result. In other words, through the inner connection created with the after-running device, in the normal position of the piston a hydraulic pre-tension of the sealing lip at the sealing element can be reliably eliminated or avoided.

The inner annular section of the after-running device can be slotted several times to form spring tabs, each of the spring tabs having a lug on the end projecting radially inwards, which can be engaged with a radial groove made in a fixing shoulder of the main section. Therefore, the above clip connection is created in a simple manner. Preferably, in this case, the lug is provided with a sloping surface on its side facing the pressure chamber, which excludes an otherwise undesirable axial play that might exist.

The after-running device can be made in an advantageous way as a one-piece plastic injection molding, which is not only cost-effective, but also guarantees the functionally desirable small tolerances in a simple manner and without the need for reworking.

Finally, the main part can be a solid body of preferably an NF metal to which a tubular sleeve forming the running surface or a coating, is applied. However, it is also possible for the main part to be an essentially pot-shaped body preferably made from sheet steel, which, if appropriate, surrounds a lining, preferably in plastic. As a result, the known running surface designs, optimised from the point of view of noise behaviour and economics, can be maintained.

BRIEF DESCRIPTION OF THE DRAWINGS

The invention is now described in more detail below on the basis of a preferred embodiment, with reference to the attached drawing, where:

FIG. 1 shows a longitudinal section view of a hydraulic cylinder with a multi-part piston according to the invention in its normal position, which has a main part and an after-running device connected to it without play, FIG. 2 an enlarged, truncated longitudinal section view of the hydraulic cylinder compared with FIG. 1 in the area at the sealing elements which, for the sake of simplicity, are shown in the undeformed state, FIG. 3 a perspective representation of the after-running device according to FIG. 2 and FIG. 4 an enlarged section view of the after-running device according to FIG. 2, only the upper half of the rotation symmetrical after-running device being illustrated.

DESCRIPTION OF THE PREFERRED EMBODIMENT

FIGS. 1 and 2 show a piston 10, a so-called plunger piston to be more precise, which, in a housing 12 of a clutch master cylinder illustrated as an example of a hydraulic cylinder 14, variably delimits a pressure chamber 16. The piston 10 has a main part 18, in the embodiment illustrated, in the form of a solid body consisting of a non-ferrous metal, possibly an aluminum alloy, on which is provided a running surface 20 for a primary sealing element 22 on the housing side. In an operating position of the piston 10 that is not illustrated, in which it is located above the running surface 20, the primary sealing element 22 seals the pressure chamber 16 in relation to an after-running area 24, so that a pressure can be built up in the pressure chamber 16 as the result of a stroke of the piston 10 to the left in FIG. 1. The piston 10 also has an after-running device 26, described in more detail below, which, in the normal position of the piston 10 shown in FIGS. 1 and 2, connects the pressure chamber 16 to the after-running area 24 in order to create a pressure equalisation between the pressure chamber 16 and the after-running area 24, allow an after-running of hydraulic fluid from the after-running area 24 into the pressure chamber 16 and, if necessary, facilitate the escape of air from the pressure chamber 16 via the after-running area 24. The essential thing is that the after-running device 26 illustrated in detail in FIGS. 3 and 4 is made separately from the main part 18 and is connected to the main part 18 without play to form the piston 10, as is described in more detail below.

Starting from its right-hand end shown in FIG. 1, the housing 12, consisting of plastic, has a graduated blind hole 28, on whose left-hand end in FIG. 1 a pressure connection 30 is provided, via which the hydraulic cylinder 14 can be connected to a slave cylinder (not illustrated). The housing 12 is also essentially provided in the center with a fixing flange 32 and an after-running connection 34, via which the hydraulic cylinder 14 can be connected to an after-running tank (not illustrated). The after-running connection 34 has an after-running duct 36 which opens into the blind hole 28 in the after-running area 24.

The blind hole 28 of the housing 12 essentially forms four function sections with a diameter reducing from right to left in FIG. 1. Starting from its right-hand end in FIG. 1, the blind hole 28 actually has a first cylindrical section 38, which changes to a second cylindrical section 42 via a small annular shoulder and a conical transition section 40 which is followed by a third cylindrical section 44 via a bigger annular shoulder.

A guide sleeve 46 for the piston 10 is secured in the first cylindrical section 38 of the blind hole 28. Between the guide sleeve 46 and the housing 12, the hydraulic cylinder 14 is sealed in relation to the atmosphere by means of a static seal in the form of an O-ring 48. On its right-hand end in FIG. 1, the guide sleeve 46 forms a stop 50 for the piston 10 which prevents the piston 10 from pulling out of the housing 12. On its left-hand end in FIG. 1, the guide sleeve 46 has a shoulder 52 on the inside perimeter which is used to accommodate a secondary sealing element 54, the dynamic sealing lip of which is permanently in contact with the running surface 20 in order to seal the outer running area 24 in relation to the atmosphere and environment.

The conical transition section 40 of the blind hole 28 is used to center a supporting ring 56 for the primary sealing element 22 whose right-hand end in FIGS. 1 and 2 rests on an annular shaped end of the guide sleeve 46 and is thereby fixed in the axial direction of the housing 12. Because of the conical seat of the supporting ring 56 on the conical transition section 40 of the blind hole 28, an annular gap 58 of a defined width occurs between the inside perimeter surface of the supporting ring 56 and the running surface 20 of the piston 10, as can be seen from FIG. 2. The annular gap 58 communicates directly with the after-running area 24, which is connected to the after-running duct 36 via grooves 60, which extend initially in a radial direction and then in an axial direction over the end and the outside perimeter of the supporting ring 56. In this case, the grooves 60 also extend through an annular shoulder 62 of the supporting ring 56, which makes sure that the secondary sealing element 54 cannot interrupt the hydraulic connection between the after-running area 24 and the after-running duct 36.

The primary sealing element 22 is then positioned on the second cylindrical section 42 of the blind hole 28 and is held in this position by the supporting ring 56. Finally, the third cylindrical section 44 of the blind hole 28 delimits the pressure chamber 16.

A piston rod 64 is actively coupled on the right-hand end in FIG. 1 of the piston 10 by means of an insert 66 attached to the main part 18. In the normal position of the piston 10 illustrated, the insert 66 is in contact with the stop 50 of the guide sleeve 46. The piston rod 64 extends through a dust collar 68 which is attached to the guide sleeve 46.

On the left-hand end of the piston 10 in FIGS. 1 and 2, the after-running device 26 is attached to the main part 18 via a clip connection, as will be described. The outside diameter of the running surface 20 of the main part 18 is slightly bigger than the outside diameter of the after-running device 26, the main part 18 having a sloping or conical transition section 70 between the running surface 20 and the after-running device 26. A cylindrical centering shoulder 72 of reduced diameter for the after-running device 26 follows the transition section 70 of the main part 18. The main part 18 ends with a cylindrical fixing shoulder 74, again with a reduced diameter, for the after-running device 26, which has a radial groove 76 and is provided with a joining slope 78 on the end in order to facilitate the joining of the after-running device 26 to the main part 18. Finally, the fixing shoulder 74 delimits the pressure chamber 16 in the housing 12 with its flat end.

FIGS. 3 and 4 illustrate in more detail the preferably one part injection-molded plastic after-running device 26. It can be clearly seen that the after-running device 26 is designed as an annular section with an essentially U-shaped cross-section. More precisely, the after-running device 26 has a radially outer annular section 80 and a radially inner annular section 82 which are connected to each other via an annular disc section 84 on the end.

The outer annular section 80 of the after-running device 26 has an essentially cylindrical outside perimeter surface 86, with which, in the normal position of the piston 10 illustrated in FIG. 2, the dynamic sealing lip of the primary sealing element 22 is in contact. The outside perimeter area 86 is provided with several—twelve in the example embodiment illustrated—equalisation grooves 88 distributed uniformly over the perimeter which, starting from the free end of the outer annular section 80 in FIGS. 3 and 4, extend in the axial direction of the after-running device 26, namely over the entire length of the outside perimeter surface 86, whose end facing the pressure chamber 16 in the installed state is slightly bevelled.

In addition, the outer annular section 80 has a cylinder inner perimeter surface 90, by means of which the after-running device 26 is centered radially on the centering shoulder 72 of the main part 18, as shown in FIG. 2. The inside perimeter surface 90 is also provided with several—twelve in the embodiment example illustrated—equalisation grooves 92 distributed uniformly over the perimeter, which, starting from the free end in FIGS. 3 and 4 of the outer annular section 80, extend in the axial direction of the after-running device 26. As can be seen clearly from FIG. 2, the axial length of the equalisation groove 92 on the inner perimeter surface 90 of the outer annular section 80 is bigger than the width of the centering shoulder 72 of the main part 18.

Finally, the free end of the outer annular section 80 forms an annular shoulder 94 with which the outer running device 26 rests without play on the main part 18 in the axial direction. The annular shoulder 94 is provided with several—twelve in the example embodiment illustrated—uniformly distributed connecting grooves 96 which run in a radial direction. As FIG. 3 shows in particular, the connecting grooves 96 in the annular shoulder 94 connect the equalisation grooves 88 on the outside perimeter surface 86 to the equalising groove 92 on the inside perimeter surface 90 of the outer annular section 80.

According to FIG. 4, the annular disc section 84 of the after-running device 26 is also provided with at least one connecting duct 98 extending in the axial direction of the after-running device 26. The connecting duct 98 is used, in the mounted state of the after-running device 26 on the main part 18, to guarantee a connection between the pressure chamber 16 and an annular chamber 100, which is delimited by the main part 18 and the after-running device 26.

As FIGS. 3 and 4 show in particular, the inner annular section 82 of the after-running device 26 has several slots to form spring tabs 102 of the clip connection. Each of the eight spring tabs 102 shown in the example embodiment illustrated has a lug 104 projecting radially inwards on the end, which in the mounted state of the after-running device 26 on the main part 18, is engaged with the radial groove 76 provided on the fixing shoulder 74 of the main part 18. As is evident from FIG. 4 in particular, each lug 104 is provided with a slope 106 on its side facing the pressure chamber 16 in order to equalise any play and to hold the after-running device 26 with its annular shoulder 94 flush on the main part 18.

It can be seen that the after-running device 26 designed in this way can be easily attached to the main part 18. To achieve this, the after-running device 26, which is made separately from the main part 18, is moved onto the main part 18 in the axial direction until the lugs 104 of the spring tabs 102 come into contact with the joining bevel 78 on the fixing shoulder 74 of the main part 18. With an additional relative displacement between the after-running device 26 and the main part 18, the spring tabs 102 spring up elastically until, towards the end of the fitting movement, lugs 104 of the spring tabs 102 clip into the radial groove 76 of the fixing shoulder 74 of the main part 18, as the annular shoulder 94 of the after-running device 26 makes play-free contact with the main part 18.

It can also be seen from the above description that in the normal position of the piston 10 illustrated in FIGS. 1 and 2, a hydraulic connection exists between the pressure chamber 16 and the after-running area 24. This is guaranteed via the equalisation grooves 88 on the outside perimeter surface 86 of
the after-running device 26 under the dynamic sealing lip of the primary sealing element 22 and, in the case of the dynamic sealing lip of the primary sealing element 22 being unfavorably pressed against the outside perimeter surface 86 of the after-running device 26, at least via the connecting duct 98, the annular chamber 100, the equalisation grooves 92 on the inside perimeter surface 90 and the connecting grooves 96 on the annular shoulder 94 of the after-running device 26 and also via the annular gap 58 between the running surface 20 and the supporting ring 56.

The hydraulic connection described between the pressure chamber 16 and the after-running area 24 is interrupted as soon as the piston 10 is moved in the direction of the pressure chamber 16, i.e. to the left in FIGS. 1 and 2, to an operating position, the sealing contour of the dynamic sealing lip of the primary sealing element 22 arriving via the running surface 20 of the piston 10 and sealing the pressure chamber 16 in relation to the after-running area 24 so that a pressure can be built up in the pressure chamber 16.

In the example embodiment illustrated, the main part 18 of the piston 10 is a solid body of a non-ferrous metal whose outside perimeter directly forms the running surface 20 of the piston 10. However, depending on the requirements concerned, this solid body can also consist of another material and/or be provided on the outside perimeter with a tubular sleeve or a coating which forms the running surface. It is also possible for the main part to be an essentially pot or beaker-shaped body in sheet steel, for example, which, if necessary, surrounds a lining preferably in plastic. In any case, in its installed state, the end of the main part facing the pressure chamber must have a geometry which allows a play-free connection with the after-running device.

The above description of the invention was made using a master cylinder of a hydraulic clutch operation for motor vehicles as an example. However, it is obvious to a person skilled in the art that the after-running device described can also be used on pistons of master cylinders for hydraulic brake systems in motor vehicles, for example.

I claim:

1. A plunger-type piston for the variable delimitation of a pressure chamber in a housing of a hydraulic cylinder, in particular of a clutch master cylinder for motor vehicles, wherein the piston is movable between a normal position and an operating position;

the piston including a main part on which a running surface is provided for a sealing element on a housing side, which, in the operating position of the piston, seals the pressure chamber;

the piston further including an after-running device with which, in the normal position of the piston, said sealing element is in contact, wherein the after-running device is adapted to connect, in the normal position of the piston and underneath said sealing element, the pressure chamber to an after-running area; and wherein the after-running device is made separately from the main part and is connected to the main part without play to form the piston.

2. A piston according to claim 1, wherein the after-running device has an annular form with an essentially U-shaped cross-section.

3. A piston according to claim 1 or 2, wherein the after-running device and the main part are connected via a clip connection.

4. A piston according to claim 1, wherein the running surface has an outside diameter and the after-running device has an outside diameter, the outside diameter of the running surface being slightly bigger than the outside diameter of the after-running device, and the main part having a sloping transition section between the running surface and the after-running device.

5. A piston according to claim 1, wherein the after-running device has a radially outer annular section and a radially inner annular section which are connected to each other via an annular disc section on the end.

6. A piston according to claim 5, wherein the outer annular section of the after-running device has a cylindrical outside perimeter surface on which the sealing element lies in the normal position of the piston and which is provided with a plurality of equalization grooves distributed over the perimeter, which extend in the axial direction from the free end of the outer annular section.

7. A piston according to claim 6, wherein the equalisation grooves on the outside perimeter surface of the outer annular section extend over the entire length of the outside perimeter surface.

8. A piston according to claim 5, wherein the outer annular section of the after-running device has a cylindrical inside perimeter surface by means of which the after-running device is centered radially on a centering shoulder of the main part and which is provided with several equalisation grooves distributed over the perimeter which extend in the axial direction from the free end of the outer annular section.

9. A piston according to claim 8, wherein the axial length of the equalisation grooves on the inside perimeter surface of the outer annular section is bigger than the width of the centering shoulder of the main part.

10. A piston according claim 5, wherein the free end of the outer annular section of the after-running device forms an annular shoulder with which the after-running device is supported on the main part in the axial direction and which is provided with several connecting grooves, which run in the radial direction.

11. A piston according to claim 10, wherein the connecting grooves on the annular shoulder connect the equalisation grooves on the outside perimeter surface to the equalisation grooves on the inside perimeter surface of the outer annular section.

12. A piston according to claim 5, wherein the annular disc section of the after-running device is provided with at least one connecting duct extending in the axial direction.

13. A piston according to claim 5, wherein the inner annular section of the after-running device is slotted several times to form spring tabs.

14. A piston according to claim 13, wherein each spring tab has a lug projecting radially inwards on the end, which can be engaged with a radial groove made in a fixing shoulder of the main part.

15. A piston according to claim 14, wherein the lug is provided on its side facing the pressure chamber with a bevel.

16. A piston according to claim 1, wherein the after-running device is a single plastic injection molding.

17. A piston according to claim 1, wherein the main part is a solid body of a non-ferrous material, to which is attached a tubular sleeve forming the running surface.

18. A piston according to claim 1, wherein the main part is a solid body of a non-ferrous material, to which is attached a coating forming the running surface.

* * * * *